(12) United States Patent
Wu et al.

(10) Patent No.: US 8,018,950 B2
(45) Date of Patent: Sep. 13, 2011

(54) SYSTEMS AND METHODS FOR DISTRIBUTING GPS CLOCK TO COMMUNICATIONS DEVICES

(75) Inventors: Shiquan Wu, Nepean (CA); Jung Yee, Ottawa (CA)

(73) Assignee: Wi-LAN, Inc., Ottawa, ON (CA)

( * ) Notice: Subject to any disclaimer, the term of this patent is extended or adjusted under 35 U.S.C. 154(b) by 282 days.

(21) Appl. No.: 12/076,315

(22) Filed: Mar. 17, 2008

(65) Prior Publication Data
US 2009/0231191 A1 Sep. 17, 2009

(51) Int. Cl.
*H04L 12/28* (2006.01)
*H04L 12/56* (2006.01)

(52) U.S. Cl. ............... 370/395.62; 370/503; 455/502; 455/503

(58) Field of Classification Search ........... 370/395.62, 370/503, 518; 713/400; 455/12.1, 502, 503
See application file for complete search history.

(56) References Cited

U.S. PATENT DOCUMENTS

| | | | | |
|---|---|---|---|---|
| 5,416,808 A * | 5/1995 | Witsaman et al. | ............ | 375/356 |
| 5,493,243 A * | 2/1996 | Ghoshal | ............ | 327/158 |
| 5,510,797 A * | 4/1996 | Abraham et al. | ............ | 342/352 |
| 5,555,295 A * | 9/1996 | Bhusri | ............ | 379/112.09 |
| 5,689,502 A * | 11/1997 | Scott | ............ | 370/281 |
| 5,727,034 A * | 3/1998 | Ojaniemi | ............ | 375/356 |
| 5,784,411 A * | 7/1998 | Willey | ............ | 375/368 |
| 5,867,564 A * | 2/1999 | Bhusri | ............ | 379/111 |
| 6,256,507 B1 * | 7/2001 | Lemieux | ............ | 455/502 |
| 6,324,586 B1 * | 11/2001 | Johnson | ............ | 709/248 |
| 6,542,754 B1 * | 4/2003 | Sayers et al. | ............ | 455/502 |
| 6,556,640 B1 * | 4/2003 | Baba | ............ | 375/376 |
| 6,597,180 B1 * | 7/2003 | Takaoka et al. | ............ | 324/512 |
| 6,671,291 B1 | 12/2003 | Soliman | | |
| 6,876,674 B1 * | 4/2005 | Ruutu et al. | ............ | 370/503 |
| 6,891,841 B2 * | 5/2005 | Leatherbury et al. | ......... | 370/401 |
| 6,937,617 B2 | 8/2005 | Rakib et al. | | |
| 6,944,188 B2 | 9/2005 | Sinha et al. | | |
| 6,965,616 B1 * | 11/2005 | Quigley et al. | ............ | 370/480 |
| 7,130,752 B2 * | 10/2006 | Yoshida et al. | ............ | 702/85 |
| 7,251,199 B2 * | 7/2007 | Eidson | ............ | 368/46 |
| 7,289,820 B2 | 10/2007 | Shiota | | |
| 7,356,036 B2 * | 4/2008 | Van Der Valk et al. | .. | 370/395.62 |
| 7,411,867 B2 * | 8/2008 | McReynolds | ............ | 368/10 |
| 7,474,637 B2 * | 1/2009 | Kim | ............ | 370/324 |
| 7,539,889 B2 * | 5/2009 | Celinski et al. | ............ | 713/400 |

(Continued)

OTHER PUBLICATIONS

International Search Report and Written Opinion as issued in International Patent Application No. PCT/CA2009/000255 on Jun. 26, 2009, 7 pages.

*Primary Examiner* — Aung S Moe
*Assistant Examiner* — Benjamin H Elliott, IV
(74) *Attorney, Agent, or Firm* — Procopio, Cory, Hargreaves & Savitch LLP

(57) ABSTRACT

A method for synchronizing network elements to a global clock derived from the GPS clock acquired by a plurality of base stations. The global clock is distributed to controllers of various networks, and from there to network access devices. The network access devices further distribute the global clock to various wire-line and local wireless networks and from there, to the users served by these networks. The user equipment is enabled with a simple clock discipliner that adjusts the local clock to the global clock, resulting in a reliable synchronization across the converged communication networks.

9 Claims, 6 Drawing Sheets

U.S. PATENT DOCUMENTS

| | | | |
|---|---|---|---|
| 7,586,954 B2* | 9/2009 | Hatanaka | 370/503 |
| 7,602,763 B2* | 10/2009 | Adolfsen et al. | 370/350 |
| 7,800,534 B1* | 9/2010 | Yenney et al. | 342/357.59 |
| 7,916,758 B2* | 3/2011 | Sun et al. | 370/503 |
| 2002/0152271 A1* | 10/2002 | Chafle et al. | 709/204 |
| 2003/0103475 A1* | 6/2003 | Heppe et al. | 370/321 |
| 2004/0062278 A1* | 4/2004 | Hadzic et al. | 370/503 |
| 2004/0228322 A1* | 11/2004 | Kim | 370/350 |
| 2005/0085259 A1* | 4/2005 | Conner et al. | 455/552.1 |
| 2005/0228902 A1 | 10/2005 | Lienhart et al. | |
| 2006/0056563 A1* | 3/2006 | Aweya et al. | 375/376 |
| 2006/0280182 A1* | 12/2006 | Williams et al. | 370/394 |
| 2007/0064851 A1 | 3/2007 | Hall | |
| 2007/0226530 A1* | 9/2007 | Celinski et al. | 713/500 |
| 2007/0270115 A1* | 11/2007 | Kravets | 455/283 |
| 2008/0049743 A1* | 2/2008 | Zampetti | 370/389 |
| 2008/0089313 A1* | 4/2008 | Cayo et al. | 370/345 |
| 2008/0139194 A1* | 6/2008 | Bloebaum et al. | 455/422.1 |
| 2008/0212618 A1* | 9/2008 | Morlon et al. | 370/503 |
| 2009/0092122 A1* | 4/2009 | Czaja et al. | 370/350 |
| 2009/0204843 A1* | 8/2009 | Celinski et al. | 713/400 |
| 2009/0225743 A1* | 9/2009 | Nicholls et al. | 370/350 |
| 2009/0231191 A1* | 9/2009 | Wu et al. | 342/357.09 |

* cited by examiner

SYSTEMS AND METHODS FOR DISTRIBUTING GPS CLOCK TO COMMUNICATIONS DEVICES

FIELD OF THE INVENTION

The invention is directed to communication networks and in particular to systems and methods for distributing GPS clock to communication devices.

BACKGROUND

In a typical cellular radio system, user wireless terminals communicate via a radio access network (RAN) to one or more core networks. The user terminals can be mobile stations such as mobile/cellular telephones, laptops/notebooks with mobile capabilities, and other portable, pocket, hand-held, or car-mounted mobile devices, which communicate voice, data and/or video with a radio access network. Alternatively, the wireless units can be fixed devices, e.g. fixed cellular terminals which are part of a wireless local loop or the like.

Clock synchronization is very critical for digital communication networks; the clock (also knows as the local oscillator) at the receiver end of a communication link must be well synchronized with the clock at the transmitter end both in time and frequency so that it can extract the signal at the right time and at the right frequency to be able to then reconstruct the signal properly.

Furthermore, when multiple user terminals communicate concomitantly with a base transmission station (BTS), scheduling of the transmission and reception time slots requires that all nodes (BTS, user terminals) of the network be synchronized in both time and frequency. Conventionally, wireless standards specify guard intervals (time, frequency) to regulate the tolerable mismatches in time or/and frequency between the two ends of a communication link. Without proper synchronization, the mismatch degrades the system performance and therefore results in an unsatisfactory quality of service. A better synchronization reduces the amount of drifting of bursts of packets beyond a defined transmission period and limits channel frequency drifts, which results in enhanced quality of the received signal and therefore in a better decoding performance.

In wired (or wire-line) networks, the global clock is usually provided using a network timing reference (NTR), and the terminals, or the nodes, needs to synchronize their own clock to the NTR. In wireless cellular communication, the global clock is usually provided to the user terminals (user equipment) units by a serving base station (BTS) via in-band signaling; a BTS transmits regularly or continuously a beacon or pilot signal based on an internal clock. The internal clock can be locally generated, derived from an infrastructure network (from legacy T1 or E1 carriers), or synthesized from an external clock. User terminals/equipment will always search for a network clock and then synchronize their individual clock with that clock and constantly track it. Wireless networks may be asynchronous or synchronous. For example, GSM (Groupe Special Mobile) systems are asynchronous and therefore the GSM terminals retrieve different clocks from different BTS. CDMA (Code Division Multiple Access) networks are synchronized in that they use a GPS (Global Positioning System) clock, so that the CDMA terminals retrieve the same clock from any CDMA BTS. Other synchronous networks are not synchronized onto GPS time; they rather use a master clock.

Equipment manufacturers and network providers are currently examining several options for achieving better synchronization. A number of main techniques currently used or under consideration: Adaptive Clock Recovery (ACR), Synchronous Ethernet, Network Time Protocol (NTP) and Precision Time Protocol (PTP). The ACR algorithms attempt to reproduce the master network clock at far-away nodes. Though ACR-based techniques are seeing some interest, the proprietary aspect of this solution makes manufacturers and providers skeptical of using them. The ITU (International Telecommunications Union) is defining a standard for Synchronous Ethernet as a way to synchronize frequencies over Ethernet networks. But Synchronous Ethernet will be suitable only for new applications because all elements in the network will need to be significantly upgraded to support the standard. NTP is the most widely used protocol for time synchronization over LANs and WANs. It is one of the oldest Internet protocols still in use. NTP is relatively inexpensive to implement, requiring little in the way of hardware. It can usually maintain time synchronization within 10 milliseconds over the public Internet and can attain accuracies of 200 sec or better in LANs under ideal conditions. However, the current version of NTP does not meet the higher precision requirements for Internet evolution, particularly for wireless Internet with latency critical applications.

IEEE 1588 Standard (Precision Clock Synchronization Protocol for Networked Measurement and Control Systems), also known as PTP (Precision Time Protocol) has received considerable attention since its introduction in 2002. It forms the basis for defining Ethernet links that can transport synchronization signals with small and well-defined delays (with accuracy on the order of sub-milliseconds), synchronizing Ethernet tasks over large physical distances. A variety of silicon vendors are now producing hardware that supports PTP. PTP is used in telecom for example in LANs supporting multicast communications over heterogeneous systems that require clocks with varying resolution and stability.

The PTP clocks are organized in a master-slave hierarchy, where each slave synchronizes to its master based on a small set of messages exchanged between the master and slave. Thus, the master sends to the slave synchronization messages that include the sending time and measures the time difference between the master and slave clocks using the response messages received from the slave. Similarly, the slave sends to the master delay request messages that contain the estimate of the sending time and measures the time difference between the slave and master clocks. The one-way delay between the clocks and the offset of the slave clock can be then determined based on two measurements, enabling the slave to correct its clock based on the offset. All clocks run a best master clock algorithm.

PTP can coexist with normal network traffic on standard Ethernet using transparent switches and 1588 boundary clocks. A boundary clock simply serves as a time-transfer standard between the subnets defined by routers or other network devices. The boundary clock has a network connection to each of the subnets. Ordinary clocks within each subnet synchronize with the boundary clock. The boundary clock resolves all of the times of the several subnets by establishing a parent-child hierarchy of clocks. However, use of cascading boundary clocks can cause nonlinear time offsets to accumulate in the servo loops that generate these clock signals, degrading their accuracy to an unacceptable degree.

Another current trend is to equip all BTSs with a GPS clock, including the BTSs serving non-CDMA networks.

New wireless technologies such as 3G (third generation) or fourth generation and B3G (beyond 3G) are being developed with a view to enable network operators to offer users a wider range of more advanced services while achieving greater network capacity through improved spectral efficiency. Also, one of the most significant features of 3G mobile technology is that it supports greater numbers of voice and data customers, especially in urban areas, and higher data rates at lower incremental cost than 2G. Services they can offer include wide-area wireless voice telephony and broadband wireless data.

It is another current trend for operators to investigate the possibility of providing a small wireless network within a home, or a small area of coverage with a limited number of users. Such a small network includes a small radio base station (RBS), also called a "femto RBS", (the term "femto" intends to indicate that the coverage area is relatively small), or "home RBS" that provides coverage over a "femto cell" for the end users when at home or inside a building where the wireless signals are significantly weaker than that outside. There are different architectures proposed for such femto-cells.

To summarize, different communication networks have different synchronization specifications and different services require different synchronization accuracies. A synchronization process usually needs a few hundreds milliseconds to plural seconds even minutes, and also the nodes need to be equipped with a tracking mechanism. This diversity results in implementation difficulties in wireless devices and intermediate equipment and results in wasteful use of system resources due to in-band signaling and complexity of the actual implementations of the synchronization functionality. The emerging technologies and systems must take these issues into account and provide for better use of available resources and enable better services at lower costs.

Therefore, there is a need to improve synchronization within an wireless access network and among wireless communications networks in general, both with a view to enhance the services offered to mobile device users and to provide for a better use of the available resources (such as bandwidth). This need is more relevant to emerging femto-cell technologies and to the respective home electronic devices.

SUMMARY OF THE INVENTION

It is an object of the invention to provide methods and systems for improved time and frequency synchronization of wireless networks.

Another object of the invention is to provide methods and systems for distributing the GPS clock among the nodes of wireless communications networks.

Accordingly, the invention provides a method of distributing a global clock to a plurality of networked devices connected over a converged network, comprising: a) acquiring the GPS clock at a GPS clock acquiring stage and deriving the global clock from the GPS clock; b) transmitting the global clock to a control stage over one or more wired connections; c) distributing the global clock to a network access stage over one or more wired connections; and d) distributing the global clock from the network access stage to all networked devices connected over the converged network.

The invention is also directed to a timing unit for a micro base station (MBS) connected to a communication network over a wireline interface, the MBS serving a wireless enabled user terminal over an air interface, the timing unit comprising: a synchronization unit for synchronizing MBS circuitry at the MBS with a global clock received over the wireline interface and inserting the global clock into a periodic bit sequence sent to the user terminal over the air interface; a MBS message generator for generating a re-hello message in response to a hello message received from the user terminal; a time measurement unit for providing MBS timing data and inserting the MBS timing data into the re-hello message; and a transceiver that transmits the re-hello message to the user terminal and receiving the hello message from the user terminal for triggering the re-hello message generator.

Still further, the present invention provides a clock discipliner for a wireless-enabled terminal connected in a femto cell, and adapted to correct a deviation $\Delta$ of a local oscillator to a global clock received from a micro base station (MBS), comprising: a sequence detector for identifying a periodic bit sequence received from the MBS and synchronizing the local oscillator to the global clock received in the periodic bit sequence; a timing adjustment unit that processes terminal timing data and MBS timing data with a view to determine the deviation $\Delta$ and to adjust the local oscillator with the deviation $\Delta$; a hello message generator for generating a hello message at preset intervals; and a transceiver for transmitting the hello message to the MBS with the terminal timing data and receiving a re-hello message from the MBS with the MBS timing data.

A method of adjusting a local clock of a wireless-enabled terminal located within the area of coverage of a micro base station (MBS) serving the wireless enabled terminal, to a global clock received in a periodic bit sequence from the MBS is also provided according to another embodiment of the invention. The invention comprises the steps of: synchronizing the local clock to the global clock; synchronizing the local clock to the global clock; transmitting a hello message; receiving a re-hello message from the MBS in response to a hello message, the re-hello message comprising MBS timing data; and determining a time deviation $\Delta$ between the global clock and the local clock using the MBS timing data and terminal timing data.

Advantageously, the invention will enable the users with better quality VoIP services, with fewer dropped frames while watching television. Enhancing quality of service (QoS) through improved synchronization also enhances efficiency of the operation of the network elements, minimizes the services degradation and improves the overall network performances.

Still further, use of reliable synchronization products and of resilient synchronization network designs and architectures, enables a seamless convergence of the wired and wireless networks and reduces service disruption in the case of a synchronization failure within a network, thus avoiding disruption of service for thousands of users.

In addition, use of the GPS for network synchronization enables a faster transition from existing network infrastructures to new technologies provided in Next Generation Networks. Synchronization solutions are necessary in order to regulate the interface of current, transitional and next generation networks during the migration period.

Still further, by using a common technology for network synchronization, the implementation complexity and material waste faced currently in this respect by the equipment vendors and devices manufactures is significantly reduced, resulting in lower network deployment and maintenance costs. In fact, many network components, such as routers, switches, hubs, base stations, etc are already equipped with a GPS clock used for various operations (e.g. location positioning).

BRIEF DESCRIPTION OF THE DRAWINGS

The invention is next described with reference to the following drawings, where like reference numerals designate corresponding parts throughout the several views.

FIG. 2B shows the network side and FIG. 2A shows the access side;

DESCRIPTION OF THE EMBODIMENTS OF THE INVENTION

Figure 1:
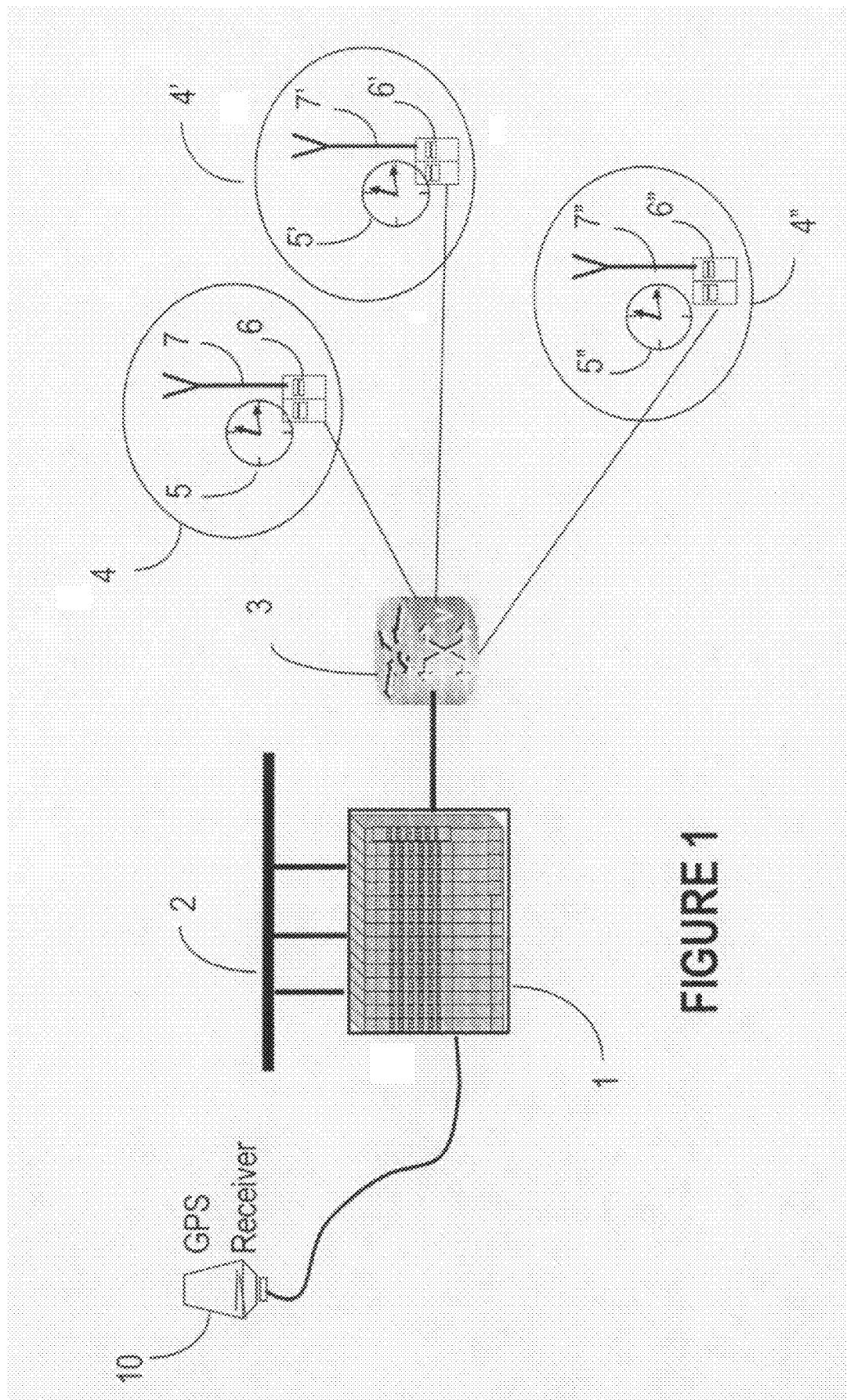
FIG. 1 shows GPS clock distribution as proposed by IEEE 1588.

FIG. 1 shows a block diagram of a clock distribution system that uses IEEE 1588. The master clock in this architecture is a GPS clock 10, provided at a node 1. Node 1 distributes the GPS master clock 10 to slave IEEE 1588 PTP clocks 5, 5', and 5", each PTP clock being provided at a node 4, 4' and 4" in this example. Nodes 4, 4' and 4" could be mobile of fixed wireless nodes, as shown by the respective antennae 7, 7' and 7". A router or a switch 3 is used in this embodiment for establishing communication between node 1 and mobile nodes 4, 4' and 4". As well, FIG. 1 shows at 2 that node 1 may distribute the GPS clock to other nodes, not shown.

However, the architecture of FIG. 1 has a number of disadvantages. For example, when the GPS clock 10 becomes unavailable, the entire network loses synchronization. This drawback can be addressed by providing back-up clocks. However, such a solution is not ideal in that it increases the network costs. Another disadvantage of the synchronization scheme shown in FIG. 1 is that it is not very reliable when applied to femto (or pico) cells. Namely, the slave clocks on the user terminals may not receive the signal from a femto BTS in some buildings or shielded spaces such as basements or tunnels.

Figure 2A:
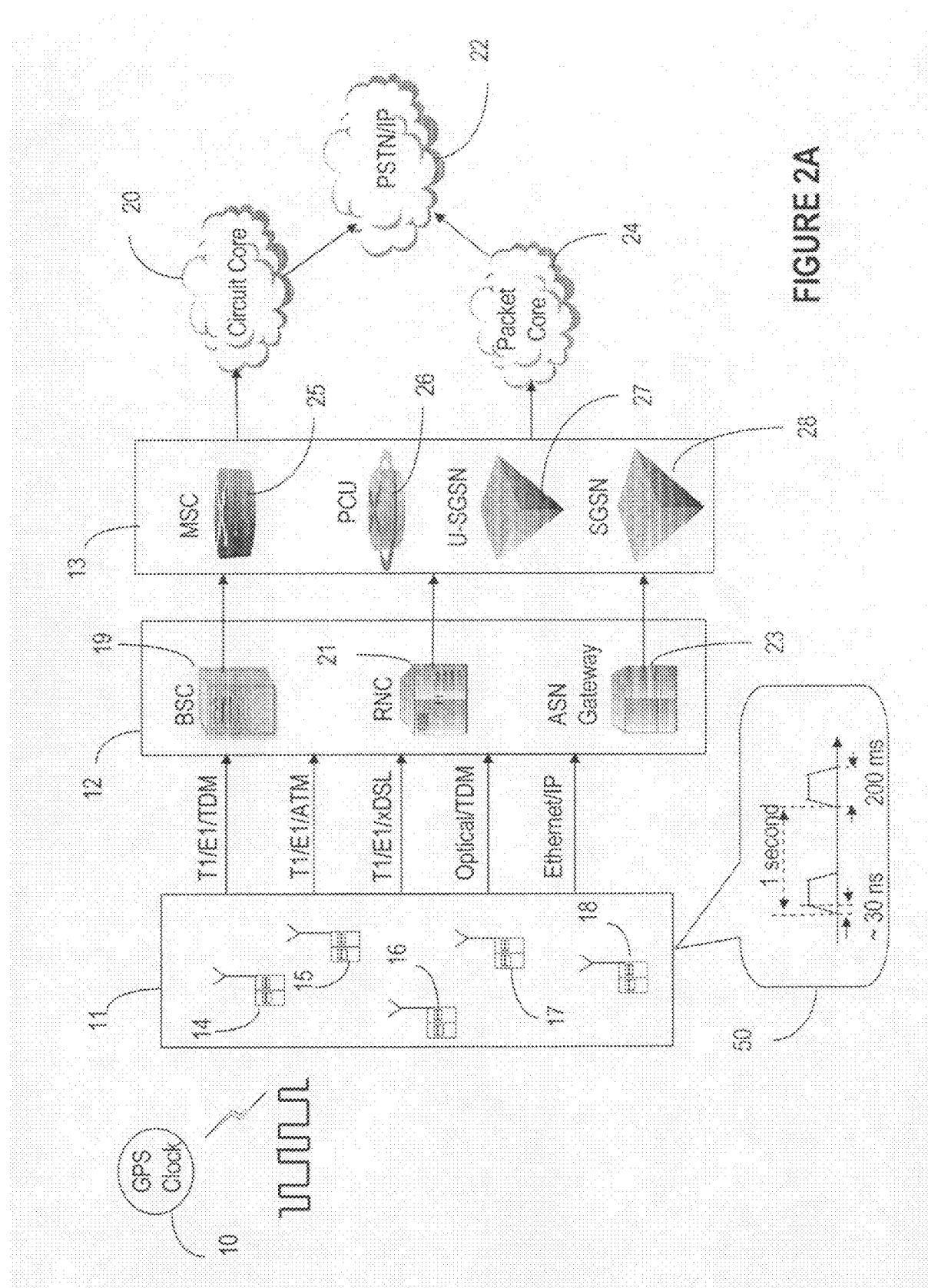
FIGS. 2A and 2B illustrate an example of GPS clock distribution across multi-technology networks according to an embodiment of the invention
Figure 2B:
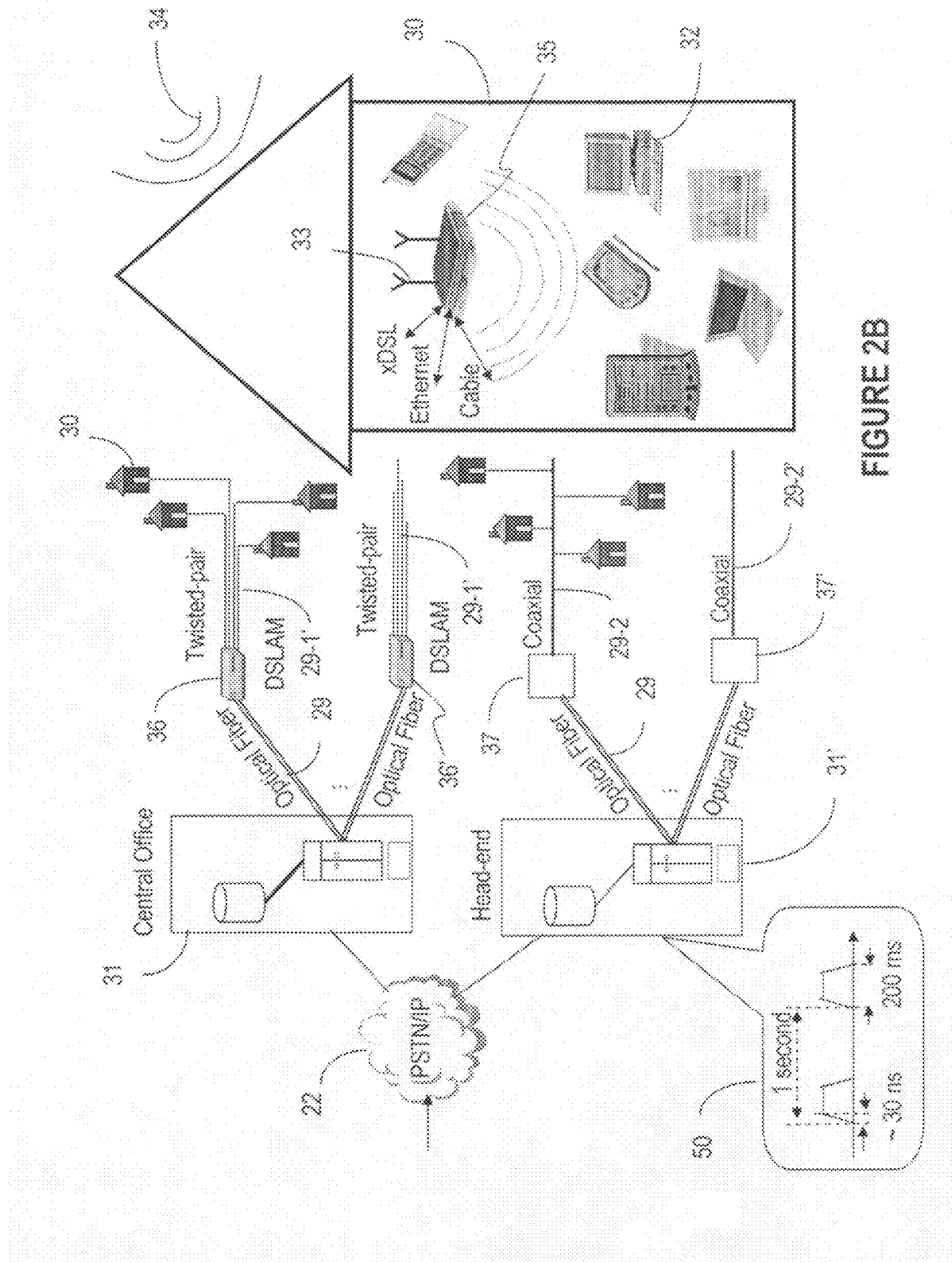

FIGS. 2A and 2B illustrate an example of GPS clock distribution across multi-technology networks (collectively called "a converged network" or a communication network) according to an embodiment of the invention. FIG. 2A shows the network side of this embodiment and FIG. 2B shows the access side. In this block diagram, the network elements were grouped based on their clock-distribution related functionality; it is to be noted that in some cases the elements are grouped physically as in FIGS. 2A and 2B, while in other architectures, they are not. In FIG. 2A, the base transceiver stations (BTSs) 14-18, commonly referred to as GPS clock capable BTSs, are designated as "a GPS clock acquiring stage" 11. The insert in FIG. 2A illustrates an example of the clock signal generated by the BTSs of stage 11. This could be a one-pulse-per-second (1 PPS) clock signal, with 200 ms duration and with a raising time of 30 ns. The BTSs of stage 11 can use any air interface or technology for communication with the mobile and fixed stations. Also, some of the BTSs of stage 11 may serve different networks, while others can serve the same network. It is also noted that the number of the BTSs of this stage is not limited to five as in FIG. 2A.

The BTSs 14-18 acquire the GPS clock 10 and transmit it to the next stage, denoted with 12. Stage 12 includes various controllers that serve the respective networks. For example, BSC 19 is a base station controller for a GSM (Global System for Mobile) or DCS (Digital Cellular System) network. RNC 21 is a radio network controller, which is the governing element in the UMTS (Universal Mobile Telecommunications System) radio access networks, which is responsible for control of the Node-Bs (the name used for UTMS base stations which are connected to the controller). The RNC connects to the Circuit Switched Core Network such as that shown at 20 through a Media Gateway and to a SGSN (Serving GPRS Support Node) in the Packet Switched Core Network 24. ASN gateway 23 is an access service network gateway (WG) as used in mobile WiMax radio access networks. ASN Gateway 23 is designed to support connection management and mobility across cell sites and inter-service provider network boundaries through processing of subscriber control and bearer data traffic. The specification refers to this stage as the "control stage" 12.

The interfaces between the stages 11 and 12 are wire-line connections that are routinely provided for connecting the BTSs to the respective controllers for management and other network operations (messaging). FIG. 2A illustrates connections such as T1, E1, TDM, ATM, DSL, Ethernet or IP by way of example only. With this arrangement, when any of the BTSs of stage 11 fails, the other BTSs will still transmit and distribute the same GPS clock to networks 20, 24 and 22. The control devices in this control stage select the best GSM clock for further distribution. They also synchronize on this best clock. For example, let's say that RNC 21 receives multiple GPS clocks from multiple BTSs of stage 11. Best clock among the clocks received can be assessed for example as the clock closest to the average of the clocks measured over a period of time. For example, if RNC 21 acquired five clock values t1-t5, it would select the clock that is closest to (t1+t2+t3+t4+t5)/5

Next stage, denoted with 13, includes in this exemplary block diagram access devices such as routers, gateways, access points (AP), etc. It shows a MSC (Multi Service Center) 25, which processes voice, data and video services to enable packet transport over a QoS enabled packet transport networks, as shown by network 20; packet based services are predominantly Ethernet or IP based. Such a wireless gateway (WG) provides multiple connections to different service providers from a single broadband access line. Packet Control Unit (PCU) 26 is enables access to GSM traffic to network 24. It performs some of the processing tasks of the BSC, but for packet data. The allocation of channels between voice and data is controlled by the base station, but once a channel is allocated to the PCU, the PCU takes full control over that channel.

A SGSN (serving GPRS support node) such as SGSN 28 is responsible for delivery of data packets from and to the mobile stations within its geographical service area. GPRS (General Packet Radio Services) is a wireless technology that provides mobility management, session management and transport for Internet Protocol packet services in GSM and WCDMA networks. Like GSM in general, GPRS is an open standards driven system and the standardization body is the 3GPP. The tasks of a SGSN node include packet routing and transfer, mobility management (attach/detach and location management), logical link management, and authentication and charging functions. A U-SGSN (UMTS Serving GPRS Support Node) 27 may be also used in stage 13 to perform similar functions for the UMTS traffic. The specification refers to stage 13 as the "network access stage" 13.

The interfaces that connect stages 12 and 13 are provided on dedicated links and may use any type of protocols, like the interfaces between stages 11 and 12, s e.g. T1/E1, Ethernet, Frame relay, ATM, IP. In some cases, the devices of these stages are collocated or integrated. For example, a PCU 26 can be built into the base station, built into the BSC or even it can be provided at the same site with a SGSN (Serving GPRS Support Node) 28. The devices in network access stage 13 select the best GSM clock for further distribution. They also synchronize on this best clock. The best clock may be selected as explained above in connection with stage 12; other methods may equally be used.

FIG. 2A shows further distribution of the GSM clock over the circuit core network 20 and over packet network 24, and further on over the PSTN/IP network 22. As a result, all nodes of network 22 are synchronized to the same clock, referred to here as a "global clock" 50. The global clock may in fact be delayed from the GPS clock, but this is irrelevant, once all nodes use the same timing and frequency references.

As indicated above, the invention is preferably directed to clock synchronization of user equipment (UE) units connected over a wireless femto cell. In this specification, we refer to network 30 as a "home network", or a "femto network" or a "femto cell", provided at a customer premise. It is to be noted that network 30, while shown as a home network, can be any other type of small area wireless network such as an office, a building, etc. The term "small" refers to an area that extends to minimum 20 meters from MBS 35.

FIG. 2B illustrated clock distribution from network 22 to a wireless access unit or gateway 35 installed at the user premise, and from there to the user devices 32 located in area of coverage of gateway 35, the femto cell 30. User devices 32 are also referred here as "user terminals", or "wireless enabled devices/terminals", or "user equipment". Such terminals include for example wireless-enabled devices such as notebooks (laptops), TV sets, Blackberry devices, Bluetooth devices, cellular and i-phones, household devices (refrigerators, alarm meters, dishwashers), etc, present in the area of coverage of the femto cell 30. In this specification, term "networked devices" refers to nodes, gateways, user terminals, access points and in general to devices that are connected over a network or over a plurality of networks (converged network) for establishing communication with other networked devices.

Figure 4A:
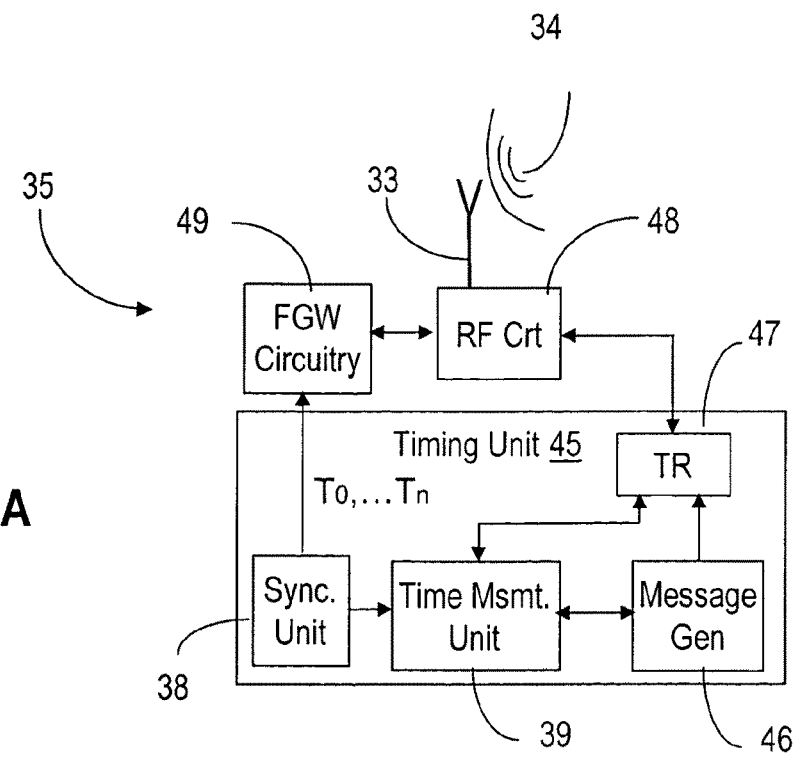
FIG. 4A illustrates a block diagram of a timing unit used for synchronization of user terminals in the femto-cell shown in the example of FIG. 2B.

The wireless access unit could be a small base station (BS), a Node-B, a controller, and communicates over an air interface with the UEs 32 in the area of coverage; this unit is referred to in this specification as a micro bas station (MBS), femto gateway, or home gateway. The general architecture of the MBS 35 is shown in FIG. 4A. MBS 35 comprises a timing unit 45 relevant to this invention general purpose circuits 49 and RF circuits 48. MBS circuitry 49 enables establishment of communication between a network (not shown) and the MBS 35 according to the respective network protocol/s, and between MBS 35 and the terminal 32 over the respective air interface 34.

In FIG. 2B, the global clock signal 50 derived from the GPS clock can arrive at micro base station 35 over both wireless and wire-line connections. The global clock may arrive to at antennae 33 of MBS 35 over a wireless connection shown 34. The global clock may also arrive at MBS 35 over a wire-line connection. In this scenario, the global clock received from PSTN 22 is distributed to various central offices (CO) 31, 31', from where it is further distributed to femto networks 30. The COs 31, 31' are generically represented by a server and an electronics cabinet. By way of example, the global clock 50 is transmitted from the CO 31 over optical fiber 29 to a DSLAM (Digital Subscriber Line Access Multiplexer) 36 from where it is distributed to MBS 35 over twisted-pair copper lines 29-1. Alternatively, by way of example, the global clock 50 is transmitted from the CO 31' over optical fiber 29 to a neighborhood node 37 or 37', from where it is distributed to MBS 35 over coaxial cables 29-2 or 29-2. Other connection arrangements that are already in place may be used for distribution of the global clock along wire-lines.

The MBS 35 then distributes the clock to the UEs 32 in the femto cell 30 over a respective air interface. This invention takes advantage of periodic control signals that are inherent to current wireless LAN/MAN technologies, whereby some type of periodic signals are transmitted to the UEs at regular intervals of time. Such technologies suitable for wireless transmission in femto/pico cells are WLAN technologies (802.11a, b, g or n), 3GPP, WiMax, etc.

Thus, gateways 35 consistent with LAN technology (802.11a, b, g or n) transmit beacon frames in order to announce control information and network identity. In the coverage area 30, UE stations 32 are likely to be working at different data rates; because beacon frames must be received by all stations, they are transmitted at the lowest data rate operating in the coverage area. Generally, beacon frames include information such as frame type, beacon frame interval/rate, sequence number, timestamp, capability information, SSID, supported rates, one or more PHY parameter sets, and the like. The UE stations located within transmission range 35 detect the beacon frames and use this information as needed; relevant to this invention is receipt and use of the timing information, needed for correct timing and channel frequencies synchronization of the UE to the gateway, based on the global clock.

Figure 3A:
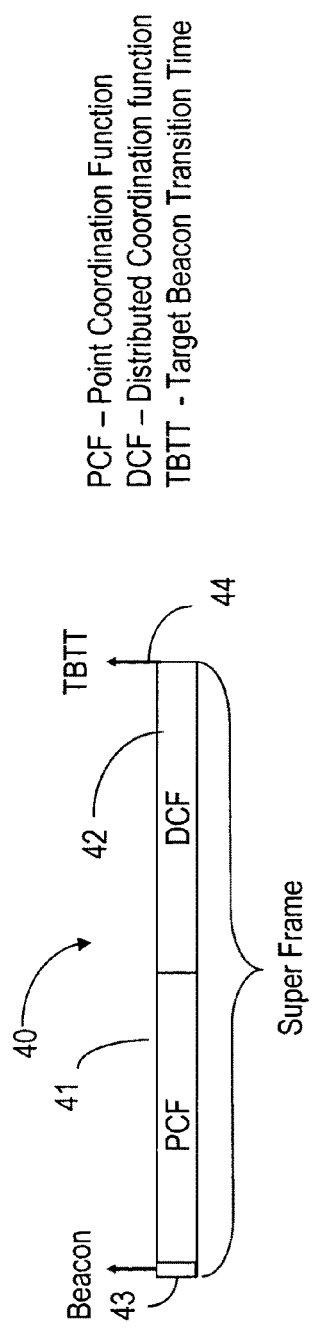
FIGS. 3A to 3C show various ways of transmitting the GPS signal within a femto access network.

FIG. 3A shows an IEEE 802.11 management beacon frame, which carries a time stamp 43, a time interval 44, and information about the supported rates, such as Point Coordination Function data 41 and Distributed Coordination Function data 52. The Point Coordination Function refers to a round robin type scheduling and Distributed Coordination Function refers to a scheduling type where every receiver competes for resources. Relevant to this invention, the superframe 40 begins with a beacon 43; a Target Beacon Transmission Time (TBTT) 44 is also provided for in the beacon frame 40, indicating to the receivers the target time for transmission of the next beacon.

Other short range and low power wireless (less than 10 meters) communications among personal devices such as PDA, Bluetooth and devices operating according to future IEEE standards (e.g. 802.15) may also be supported by the gateway 35.

Figure 3B:
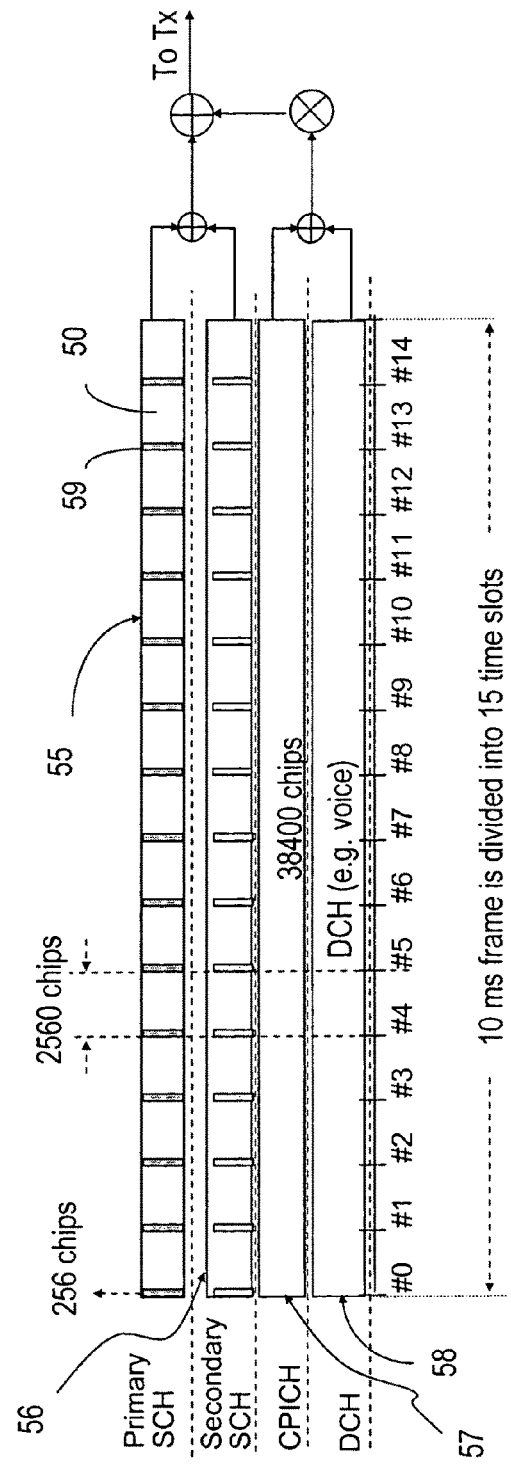

FIG. 3B shows a Primary Synchronization Channel (PSC) used for example by W-CDMA air interface, used for higher speeds and better security. W-CDMA is a wideband spread-spectrum mobile air interface that utilizes the direct sequence Code Division Multiple Access signaling method (or CDMA) to achieve higher speeds and support more users compared to the implementation of time division multiplexing (TDMA) used by 2G GSM networks. W-CDMA is used e.g. by UMTS (Universal Mobile Telecommunications System), a 3G cell phone technology. According to this technology, a subscriber unit first searches for the primary synchronization code (PSC), a component of the primary synchronization channel. The PSC is a fixed 256-chip sequence that is transmitted during the first 256 chips of each 2,560-chip slot. The PCS is the same for every cell in the system. Once the subscriber unit determines the presence of a base station, it acquires slot timing from that station. Then, the subscriber unit searches for the secondary synchronization codes (SSCs), which make up the secondary synchronization channel. There are 16 256-chip SSCs. Each base station transmits one SSC, along with the PSC in the first 256 chips of every slot (each of the 16 SSCs and the PSC are orthogonal). There are 64 unique sequences of 15 SSCs, each sequence being associated with one of 64 scrambling code groups. Each base station transmits one SSC sequence (15 SSCs per frame) corresponding to the code group containing that base station's scrambling code. The set of 64 SSC sequences are selected to be comma free; that is, no sequence is equal to a cyclic shift of any of the other sequences or any non-trivial cyclic shift of itself. Because of this property, once a subscriber unit determines the sequence of SSCs transmitted in any 15 consecutive slots, it can determine both the frame timing and which of the 64 SSC sequences was transmitted, thus identifying the scrambling code group in which the base station belongs. Since there are eight codes in each scrambling code group, the number of candidates has been reduced to eight.

Figure 3C:
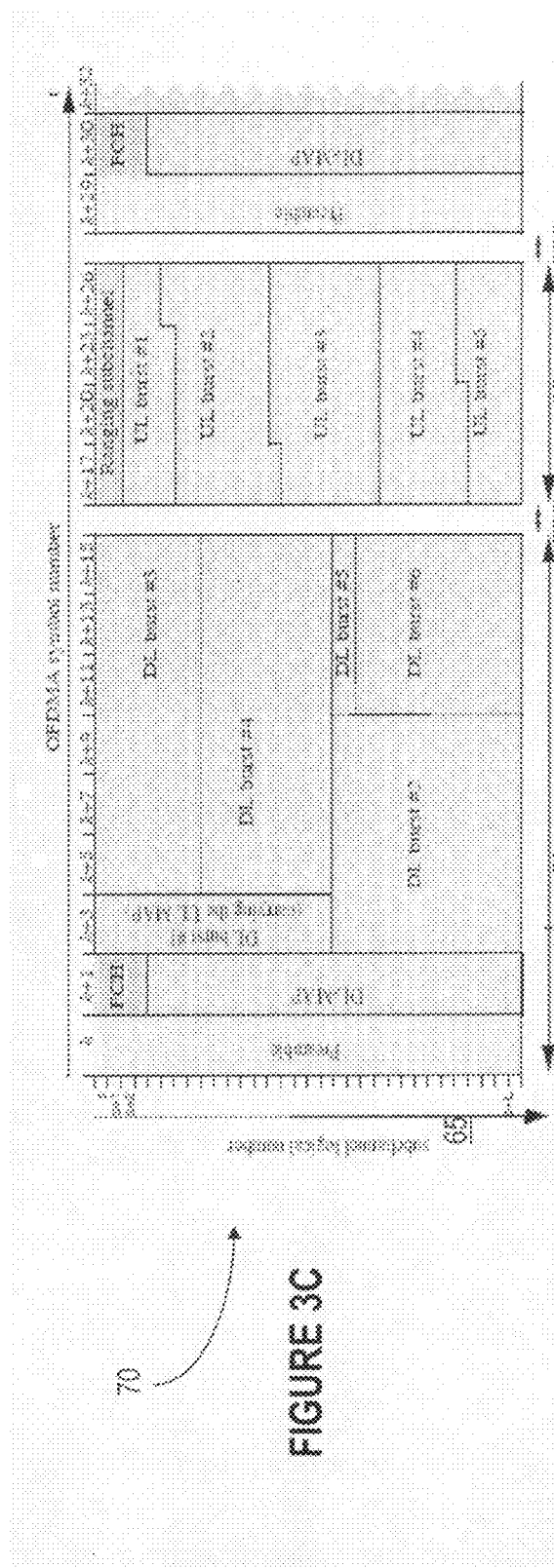

Service providers are also deploying IEEE 802.16 (WiMax) networks for longer range wireless communications in the metropolitan areas. WiMax is known to operate well indoors, so that it is suitable for home networks. FIG. 3C shows a WiMax frame 70 with a respective downlink sub-frame 66. As seen, a preamble 65 is sent at the beginning of each downlink sub-frame, it being used by the UE unit for cell/sector identification, frequency reuse factor, synchronization and channel performance assessment. The preamble has one of 128 distinct patterns which identify each sector in which a BTS transmits, using a cell ID; the neighbouring cells or sectors have different patterns so that the user terminals are able to distinguish a cell or sector from others. An initial synchronization operation determines the start of the frame by observing the autocorrelation of the time domain replica of the preamble, with a view to detect the preamble. Preambles are usually sent with a boosted power (say, 2.5 dB higher than the average data signal strength).

To summarize, the current technologies use a preset control signal such as a beacon, a synchronization code received on the PSC (primary synchronization channel) or a preamble that is periodically transmitted to the user equipment to enable synchronization and other basic operations required for setting-up a connection. This signal is referred to here as a "periodic bit sequence", where the word "periodic" is used to indicate that the bit sequence is transmitted periodically in the downlink (with each downlink frame). This signal carries the global clock in the bit sequence, which is known to the receiver, whereby the receiver can detect the sequence and extract the clock. Each of these bit sequences produces a signal pulse each 100 mseconds as an example, so that each local clock of a user terminal 32 could be synchronized with this 10 pulse per second (PPS) clock.

It is noted that the invention is not limited to use of the periodic bit sequences described above for some of the current/emerging wireless technologies; other existing and/or emerging protocols may provide for bit sequences with similar characteristics; these may as well be used for time and frequency synchronization of the user wireless-enabled terminals.

Figure 4B:
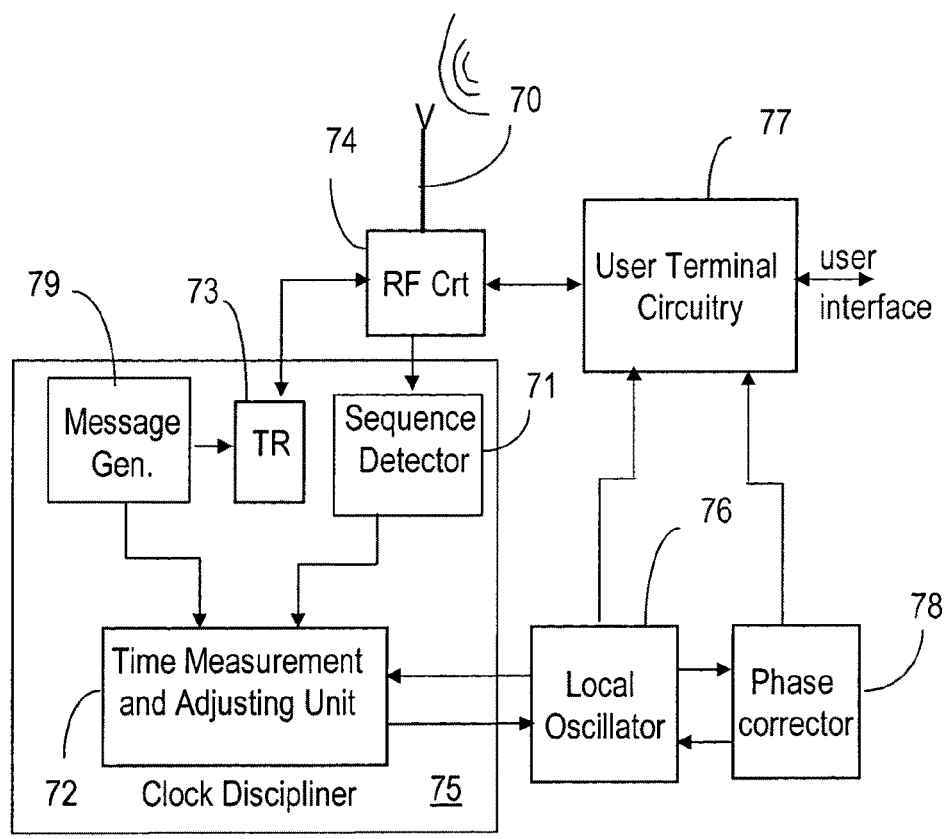
FIG. 4B illustrates a block diagram of a clock discipliner used for synchronization of UEs in the femto-cell shown in the example of FIG. 2B.

FIGS. 4A and 4B show block diagrams of embodiments of the micro base station 35 and wireless-enabled user terminal 32, illustrating the units relevant to synchronization of terminals in the femto-cell 30 shown in the example of FIG. 2B to the GPS clock. FIGS. 4A and 4B are described next in connection with FIG. 5, which provides time diagrams illustrating how a user device corrects its clock to align it with the GPS clock.

FIG. 4A shows an embodiment of the block diagram of the MBS 35, which comprises MBS circuitry 49 interfacing the MBS with a communication network (e.g.' PSTN/IP network 22 in FIG. 2B), RF circuits 48 which interfaces the MBS with the user terminals 32 located in the femto cell 30 over antenna 33 using air interface 34, and a timing unit 45 that enables the user terminals to synchronize to the clock used by MBS 35. As indicated in connection with FIG. 2B, in this example unit 49 is connected with e.g. a DSLAM 36, or a neighborhood node 37 over twisted pair or cable connections, generally denoted with 29. This connection provides the respective user traffic (e.g. voice, video, data), the global clock, which is synchronous with the GPS clock, as described above. It is to be noted that the invention may equally be used with other synchronization signals received by the MBS 35 through messaging; this could be a network timing reference (NTR) or the like. MBS circuitry 49 may process signals of various technologies such as Ethernet, IP, and/or the other technologies that may already available at the respective premise. This unit includes in general terms a transceiver, modulators/demodulators, baseband processors, amplifiers, filters, etc. The air interface 34 is of the type that uses a predetermined bit sequence at the beginning of the frames, as shown and described in connection with FIGS. 3A, 3B and 3C.

Timing unit 45 enables functionality according to this invention. A synchronization unit 38 is used for extracting the global clock from the signal received on wireline 29 and synchronizing the local clock of the MBS and therefore the MBS to this clock. As such, the global clock is used for generating the periodic bit sequence inherently sent to user terminals over the air interface 34. Unit 45 also comprises a message generator 46 that generates a "re-hello message" in response to a "hello message" received from a user terminal 32, and a transceiver 47 used to exchange the hello and re-hello message with terminal 32. It is noted that transceiver 47 could be integrated with the MBS transceiver; the embodiment of FIG. 4A is an example where a separate transceiver is used for correcting the time alignment between the MBS and the terminals. A time measurement unit 39 is also part of the timing unit 45; unit 39 measures the time of arrival of the hello message, denoted here with D2, and also measures a time D3 when a re-hello message is transmitted by the MBS. This time measurements, referred to as MBS timing information, are inserted in the re-hello message and transmitted to the user terminal.

The MBS timing information is measured using the MBS clock, which is synchronous with the global clock. The MBS clock denoted with $T_0, T_1, \ldots T_n$ in FIG. 5(a). In the example shown on graph (a), the periodic bit sequence (PBS) is transmitted at time $T_0$, the hello message is received at time D2, and the re-hello message is transmitted at time D3. Graph (a) also shows that the MBS timing information includes an offset denoted with $\beta$, which accounts for the delay within MBS 35 between the time D2 when the hello message is received and the time D3 the re-hello message is transmitted; this offset is known to the user terminal.

FIG. 4B shows an example of the user terminal 32 according to an embodiment of the invention. A local oscillator 76 provides the local clock that needs to be aligned to the MBS clock. The circuitry of the terminal 32 is shown generically as user terminal circuitry 77, which includes modulator/demodulators, fitters, processors, amplifiers, power supply circuits, etc. The RF circuit block 74 represents the radio frequency interface that receives and provides the radio signal over the air interface.

According to a preferred embodiment of the invention, each user device 32 includes a "clock discipliner" 75, for correcting the deviations of the local oscillator 76 from the global clock used by the MBS 35. The clock discipliner includes a sequence detector 71 that identifies the periodic bit sequence received from the MBS over the air interface, a timing measurement and adjustment unit 72 that processes timing data to determine the deviation between the global and local clocks and adjusts the local clock to the global clock. The clock discipliner also comprises a message generator 79 that triggers transmission of the hello message at preset intervals of time, and a transceiver 73 for enabling exchange of timing data with the MBS 35. It is noted that transceiver 73 could be integrated with the terminal transceiver; the embodiment of FIG. 4B is an example where a separate transceiver is used for correcting the time alignment between the MBS and the terminals.

Figure 5:
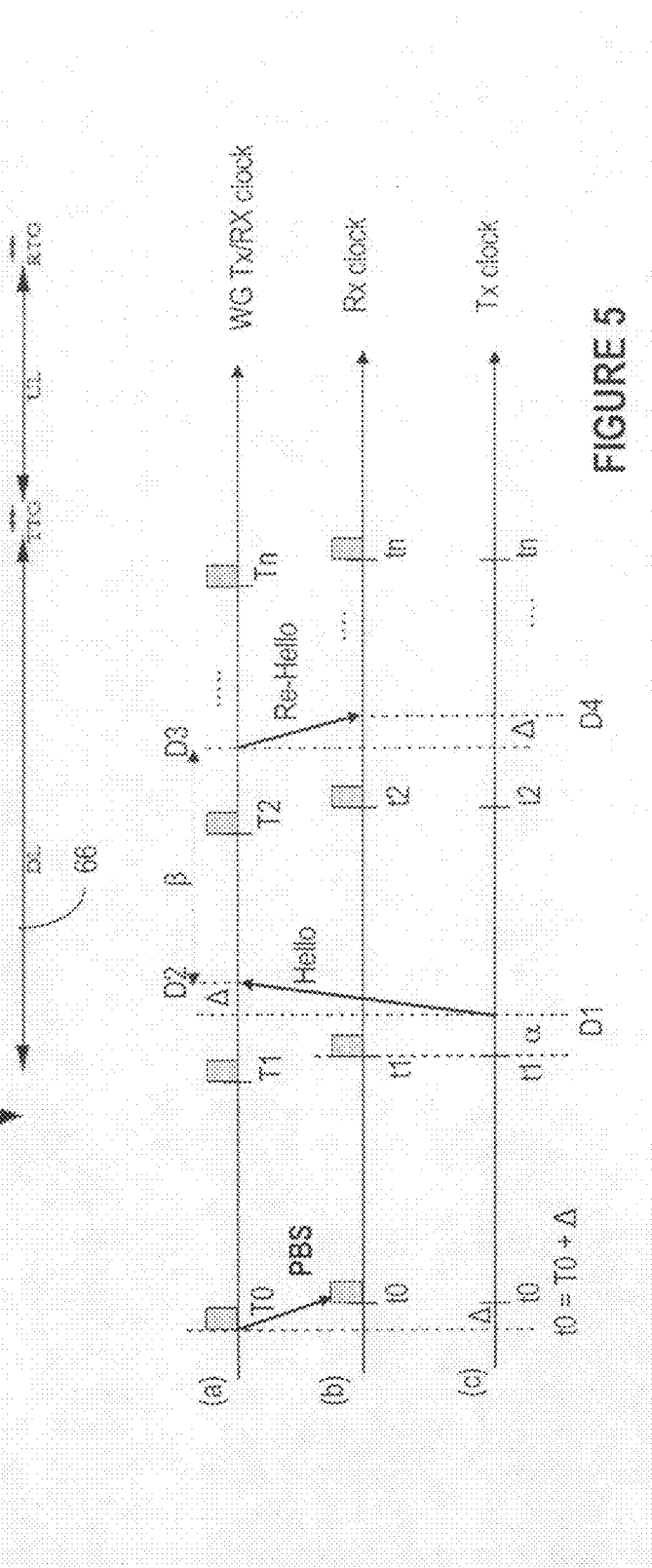
FIG. 5 illustrates how a user device synchronizes its clock with the GPS clock.

As indicated above, the local clock 76 of devices 32 is "disciplined" with the global clock, which could be for example a 10 PPS clock derived from the GPS clock and synchronous with the GPS clock. Graph (b) of FIG. 5 illustrates the receiver clock (Rx clock) of a wireless terminal 32, denoted with $t_0, t_1, \ldots t_n$), and graph (c) shows the transmit clock (Tx clock) of terminal 32 (which is synchronous with the Rx clock). As seen in FIG. 5, the Rx/Tx clock of the terminal 32 is not aligned with the clock of the gateway 35; in this example, the local clock is delayed by $\Delta$ with respect to the global clock 50, and this delay must be corrected. Thus, the PBS arrives to the terminal delayed by $\Delta$ from the global clock, the hello message arrives to the MBS with the delay $\Delta$ with respect to the device clock, and the re-hello message arrives to the terminal with the delay $\Delta$ with respect to the global clock. In operation, the sequence detector 71 of clock discipliner 75 detects the periodic bit sequence (beacon, PSC, preamble, or the like) at time to rather than $T_0$ and synchronizes the receiver clock on $t_0$; with the delay $\Delta$.

In operation, the sequence detector 71 of clock discipliner 75 detects the periodic bit sequence (beacon, PSC, preamble, or the like) at time to rather than $T_0$ and synchronizes the receiver clock on $t_0$; with the delay $\Delta$.

Upon detection of the sequence, message generator 79 initiates transmission of the hello message from the terminal 32 to the MBS 35. This time is denoted with D1 and is recorded by unit 72. D1 could be measured or calculated by adding to the time $t_1$ a pre-agreed offset, denoted with $\alpha$; $\alpha$ accounts for the delay within the terminal between the clock bit $t_1$ and the moment the hello message is transmitted. Thus, $$D1 = t_1 + \alpha = T_1 + \alpha + \Delta$$

As seen on graph 5(a), MBS 35 receives the hello message after the delay $\Delta$. As indicated above, MBS 35 measures the time D2 at which it received the hello message using the global clock.

$$D2 = T_1 + \alpha + 2\Delta$$

Next, MBS 35 responds to the hello message with the re-hello message at time D3, which is delayed with respect to D2 with offset $\beta$:

$$D3 = D2 + \beta =$$
$$= T_1 + \alpha + \beta + 2\Delta$$

Next, at a time denoted with D4, unit 72 receives the re-hello message with time measurement D3, and derives from this the delay (clock deviation) $\Delta$, since D4, $\alpha$, $\beta$ and $t_1$ are known to it.

$$\alpha. \; D4 = D3 + \Delta = T_1 + \alpha + \beta + 2\Delta = t_1 + \alpha + \beta + 2\Delta$$

The local clock may now be corrected with $\Delta$. This operation is repeated at regular intervals of time, which are preset by message generator 79. Since time measurements D1 and D4 are measured using the terminal clock; the specification refers to these measurements as "terminal timing data".

We claim:

1. A method of distributing a global clock to a plurality of networked devices connected over a converged network, comprising:
   acquiring a Global Positioning System (GPS) clock with a plurality of base transceiver stations at a GPS clock acquiring stage and each of said plurality of base transceiver stations deriving a global clock from said GPS clock;
   transmitting, over one or more wired connections, said global clocks from said plurality of base transceiver stations to a control stage having a plurality of controllers which control the base transceiver stations;
   distributing said global clocks from the control stage to a network access stage over the one or more wired connections, wherein devices within the control stage select a best clock for distribution to the network access stage, wherein the best clock is closest to an average of the global clocks measured over a period of time; and
   distributing the best global clock from said network access stage to all networked devices connected over the converged network, wherein devices within the network access stage select the best clock for distribution to the networked devices.

2. The method of claim 1, wherein said global clock is a one-pulse-per-second clock signal, with a 200 ms duration and a rise time of 30 ns.

3. The method of claim 1, wherein said GPS clock acquiring stage includes first and second base station transceiver stations (BTSs), wherein when the first BTS fails to acquire or provide said GPS clock, the second BTS continues to provide the global clock to said control stage.

4. The method of claim 1, wherein said control stage includes first and second controllers, and when the first controller fails to receive or provide said global clock, the second controller continues to provide the global clock to said network access stage.

5. The method of claim 1, wherein said network access stage includes first and second access devices, and when the first access device fails to receive or provide said global clock, the second access device continues to provide the global clock to said networked devices.

6. The method of claim 1, wherein said networked devices include a femto cell provided within a customer premise, said femto cell being comprised of a micro base station (MBS) serving a plurality of wireless-enabled terminals.

7. The method of claim 6, further comprising, at said femto cell:
   receiving said global clock at said MBS from the converged network over an access interface;
   transmitting said global clock to said wireless-enabled terminals over an air interface using a predetermined periodic bit sequence inherent to said air interface; and
   synchronizing all said wireless-enabled terminals with said global clock.

8. The method of claim 7, wherein said access interface between said converged network and said MBS is provided over a wired connection available at said customer premise.

9. The method of claim 7, further comprising:
   adjusting a terminal clock inherently provided at each said wireless-enabled terminal to said global clock provided by said predetermined periodic bit sequence.

* * * * *